United States Patent
Kusaki et al.

(10) Patent No.: US 6,316,856 B1
(45) Date of Patent: Nov. 13, 2001

(54) MOTOR FOR ROTATING A DISK-SHAPED INFORMATION RECORDING MEDIUM IN A DISK DRIVE APPARATUS

(75) Inventors: Kenji Kusaki, Kanagawa; Toru Kimura, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/521,508

(22) Filed: Mar. 8, 2000

(30) Foreign Application Priority Data

Mar. 9, 1999  (JP) .................................................. 11-061896

(51) Int. Cl.$^7$ ...................................................... H02K 5/16
(52) U.S. Cl. ............................ 310/90; 310/67 R; 384/100
(58) Field of Search ........................ 310/90, 90.5, 67 R; 384/113, 114, 100, 291; 360/97.01, 99.12, 98.08

(56) References Cited

U.S. PATENT DOCUMENTS

| | | | |
|---|---|---|---|
| 4,570,093 | * | 2/1986 | Morii et al. .............................. 310/46 |
| 5,223,758 | * | 6/1993 | Kataoka et al. ......................... 310/90 |
| 5,426,548 | * | 6/1995 | Fujii et al. ............................ 360/98.08 |
| 5,541,460 | * | 7/1996 | Dunfield et al. ..................... 310/67 R |
| 5,623,382 | * | 4/1997 | Moritan et al. ..................... 360/99.08 |
| 5,678,929 | * | 10/1997 | Parsoneault et al. ................. 384/112 |
| 5,683,183 | * | 11/1997 | Tanaka et al. ......................... 384/100 |
| 5,847,479 | * | 12/1998 | Wang et al. ............................. 310/90 |
| 5,977,676 | * | 11/1999 | Wijdenes ................................. 310/90 |
| 5,994,803 | * | 11/1999 | Jung ........................................ 310/51 |

* cited by examiner

Primary Examiner—Joseph Waks
(74) Attorney, Agent, or Firm—Frommer Lawrence & Haug LLP; William S. Frommer; Matthew K. Ryan

(57) ABSTRACT

A motor for rotating a disk-shaped information recording medium for a disk drive apparatus which is capable of rotating a higher-capacity information recording medium and a relatively lower-capacity recording medium at different speeds. This motor includes a stator; a rotor that rotates with respect to the stator with a shaft as the center of rotation when a drive winding is energized; a bearing that is provided on the side of the stator and rotatably supports the shaft of the rotor; a dynamic pressure generation section for generating dynamic pressure by filling a fluid between the bearing and the shaft when the shaft is rotated above a predetermined speed; a judging member for judging whether the disk-shaped information recording medium that is attached to the rotor is a relatively lower-capacity medium or a higher-capacity medium; and a control section for supplying the drive winding of the stator with a drive signal for a first rotation speed when a judgment signal produced by the judging member indicates the relatively lower-capacity medium, and with a drive signal for a second rotation speed that is higher than the first rotation speed when the judgment signal indicates the higher-capacity medium.

18 Claims, 4 Drawing Sheets

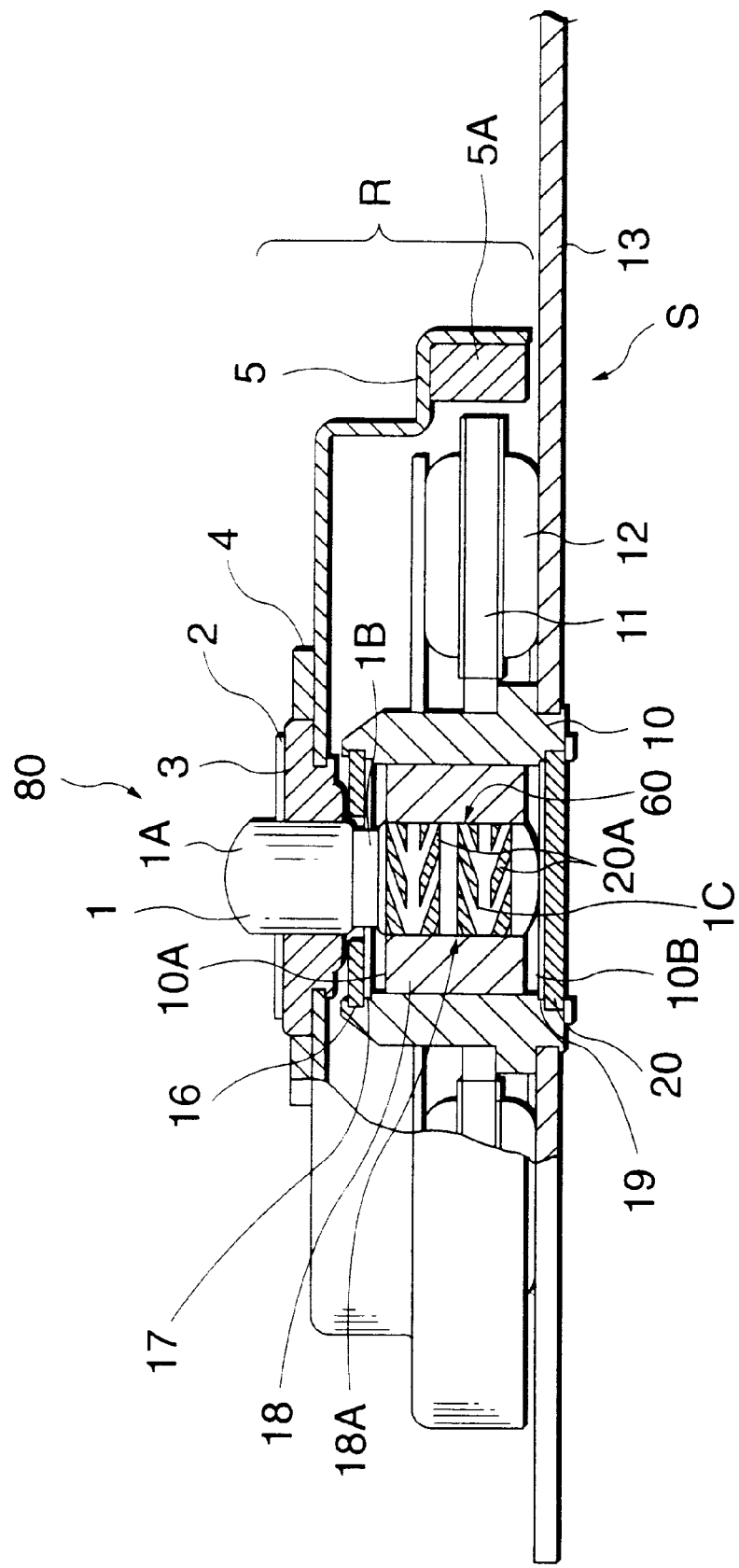

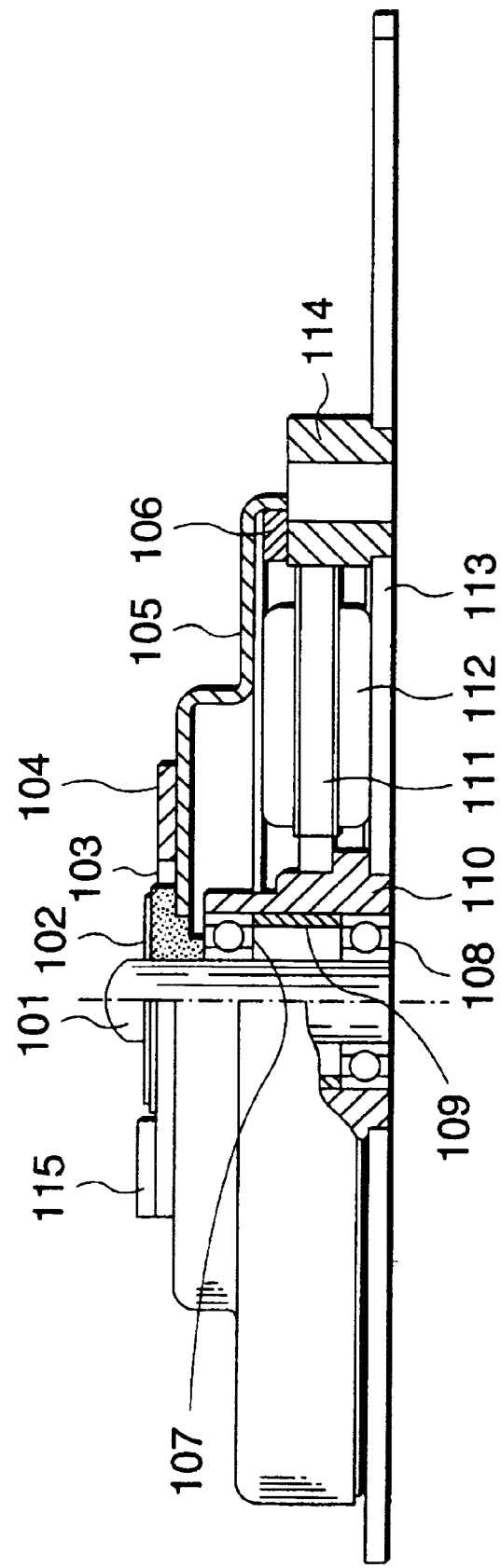

MOTOR FOR ROTATING A DISK-SHAPED INFORMATION RECORDING MEDIUM IN A DISK DRIVE APPARATUS

BACKGROUND OF THE INVENTION

A. Field of the Invention

The present invention relates to a motor for rotating a disc-shaped information recording medium in a disk drive apparatus. The present invention further relates to a motor for rotating a magnetic recording medium, such as a floppy disk, in a disk drive apparatus.

B. Related Art

Floppy disk drives (hereinafter abbreviated as FDDs) that are commonly used as computer peripheral equipment use a disk having an unformatted capacity of about 2 MB per disk. In recent years, disk drives are known which are capable of driving a high-capacity floppy disk having a capacity of more than 100 MB per disk which enable a high data transfer rate.

In general, the bearing of a spindle motor for an ordinary FDD that uses only a disk of about 2 MB is a sintered metal oil-retaining bearing (also called simply a metal bearing or an oil-retaining bearing) which is inexpensive. This bearing is formed by compression-molding and then sintering a copper-type or iron-type metal powder, and is a type of sliding bearing that is impregnated with oil as a lubricant.

FIG. 4 is a conceptual diagram of a conventional spindle motor using a ball bearing. The rotor of this motor is arranged as follows.

As shown in FIG. 4, a rotor magnet 106, which is magnetized in such a manner that N poles and S poles are arranged alternately in the circumferential direction, is bonded to a rotor case 105 that is made of a magnetic material, such as galvanized sheet iron SECC. The rotor case 105 is fixed to a boss 103 by caulking, which is made of brass or a brass-like material. The boss 103 is press fit to a shaft 101, and the shaft 101 is rotatably supported by bearings 107 and 108. To reliably support and chuck a disk, a disk chucking magnet 104 and a disk chucking pin 115 in the rotor are attached to the rotor case 105. To improve slidability at the time of disk chucking, a disk hub seating sheet 102, typically made of ethylene tetrafluoride film, is bonded to the boss 103 with an adhesive.

On the other hand, in the stator of the motor, each iron core 111 formed by laminating magnetic steel sheets, such as silicon steel sheets, is provided with a winding 112. Stator assemblies formed of a laminated iron core 111 and a winding 112 are fixed to a bearing housing 110 so as to be opposed to the magnet 106 in radial directions. The bearing housing 110 is caulked to a motor base 113 that is made of galvanized sheet iron or similar metal.

In this conventional motor, the motor base 113 is a metal circuit board. In addition, the rotor is driven by supplying electricity to the windings 112 via the wiring on the motor base 113, a harness and a drive circuit (both the harness and the drive circuit not shown in FIG. 4).

FIG. 4 illustrates that in this conventional motor, a spacer 109 for determining the bearing position and the bearings 107 and 108 are bonded to the bearing housing 110. A prop 114 for attaching the motor to a high-capacity FDD is caulked to the motor base 113. Although this motor has higher axial deviation accuracy than a conventional motor using the sintered metal oil-retaining bearing, this motor is disadvantageous in cost because of the use of the ball bearing (i.e., bearing 108) which is expensive.

However, the sintered metal oil-retaining bearing cannot be used, in itself, in a high-capacity FDD that is required to have high axial deviation accuracy to cope with a small track pitch. Therefore, a ball bearing (i.e., a rolling bearing) is employed in spindle motors for a high-capacity FDD. Further, it has been found desirable to drive both a lower-capacity FD and a higher-capacity FD with a single drive motor.

OBJECTS AND SUMMARY OF THE INVENTION

Therefore, it is an object of the invention to provide an improved motor for rotating an information recording medium in a disk drive apparatus which avoids the aforementioned deficiencies of the prior art.

It is also an object of this invention to provide an improved motor for rotating a magnetic recording medium, such as a floppy disk, in a disk drive apparatus.

It is another object of this invention to provide an improved motor for rotating an information recording medium in a disk drive apparatus which eliminates use of expensive sintered metal oil retaining bearings.

It is a further object of the present invention to provide a motor for rotating an information recording medium in a disk drive apparatus which can rotate both a higher-capacity information recording medium and a lower-capacity information recording medium at different speeds.

The present invention relates to a motor for rotating a disk-shaped information recording medium which includes a stator; a rotor that rotates with respect to the stator with a shaft as a center of rotation when a drive winding is energized; a disk chucking portion for supporting the disk, which is provided on said rotor; a bearing that is provided on the side of the stator and rotatably supports the shaft of the rotor; a dynamic pressure generation section for generating dynamic pressure by filling a fluid between the bearing and the shaft when the shaft is rotated at a predetermined speed; a judging member for judging whether the disk-shaped information recording medium that is attached to the disk chucking portion is a first type capacity medium or a second type capacity medium; and a control section for supplying the drive winding of the stator with a drive signal for a first rotation speed when a judgment signal produced by the judging member indicates the first type capacity medium, and with a drive signal for a second rotation speed that is higher than the first rotation speed when the judgment signal indicates the second type capacity medium.

With the above configuration, both of a lower-capacity medium for relatively low speed rotation and a medium having a relatively high capacity can be rotated at rotation speeds suitable for the respective media.

In particular, the bearing functions as a sliding bearing in the case of a lower-capacity medium. In the case of a higher-capacity medium, the bearing enables highly accurate rotation by virtue of a dynamic pressure effect that is obtained by the dynamic pressure generation section.

As a further feature of the invention, the dynamic pressure generation section can be formed on a cylindrical inside surface of the bearing that is opposed to an outside circumferential surface of the shaft.

In addition, the dynamic pressure generation section can be formed on an outside circumferential surface of the shaft that is opposed to an inside surface of the bearing.

According to the invention, the judging member detects, through contact, a hole that is provided in a case of the disk-shaped information recording medium, and the control section supplies a drive signal to the drive winding of the stator for the second rotation speed when the judging member detects the hole.

The above, and other objects, features and advantages of the present invention, will become apparent in the following detailed description of a preferred embodiment which is to be read in conjunction with the accompanying drawings, and in which like reference numerals are used to identify the same or similar parts in the several views.

BRIEF DESCRIPTION OF THE DRAWINGS

The following detailed description given by way of example, but not intended to limit the invention solely to the specific embodiments described, may be best understood in conjunction with the accompanying drawings in which:

FIG. 3 is a partially cutaway front view of another preferred embodiment of a motor for rotating a disk-shaped information recording medium in a disk drive apparatus in accordance with the teachings of the present invention.

FIG. 4 is a front view showing a conventional motor.

DETAILED DESCRIPTION OF CERTAIN PREFERRED EMBODIMENTS OF THE INVENTION

Figure 1:
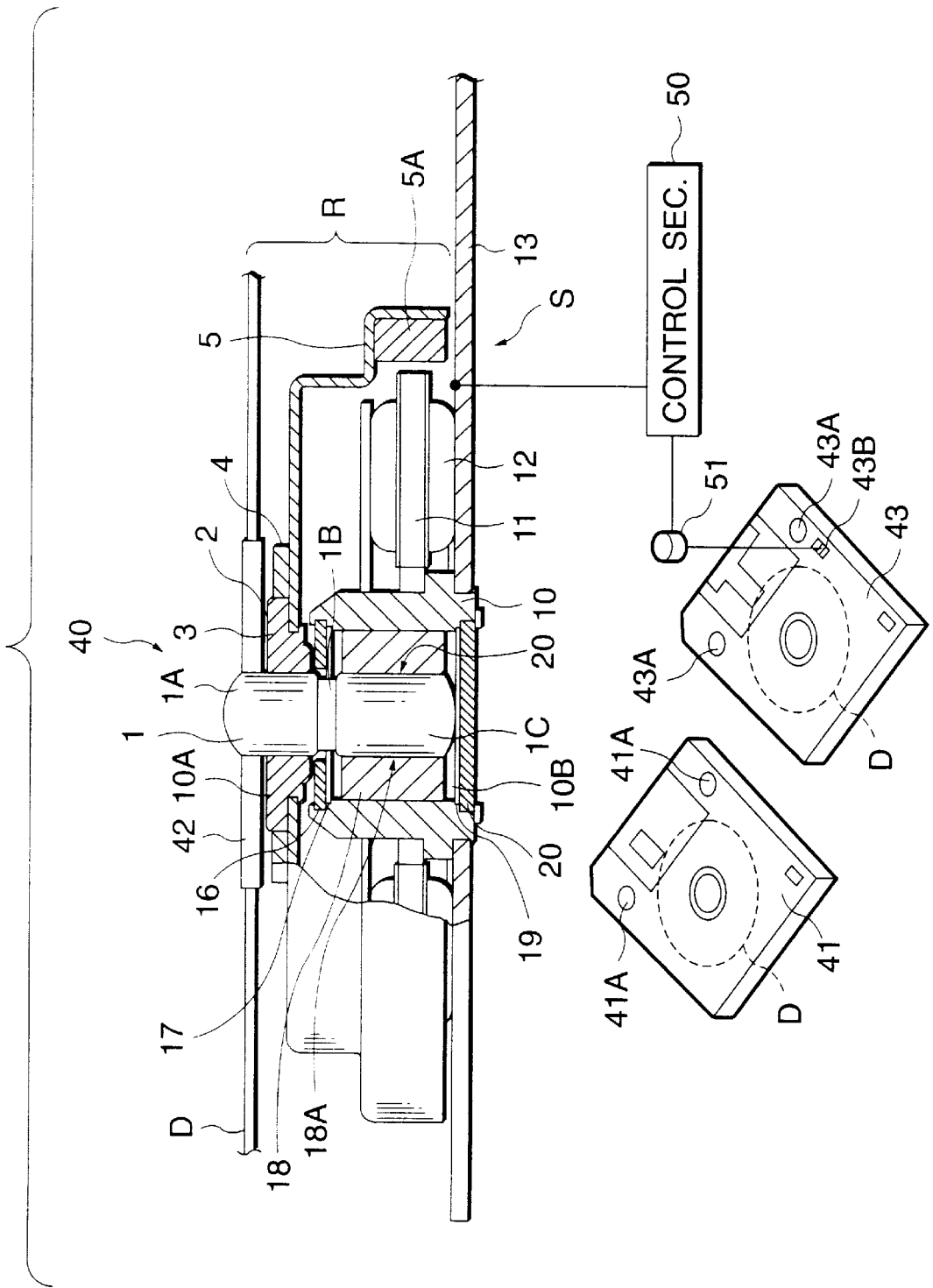
FIG. 1 is a partial sectional front view of a preferred embodiment of a motor for rotating a disk-shaped information recording medium in a disk drive apparatus in accordance with the teachings of the present invention.
Figure 2:
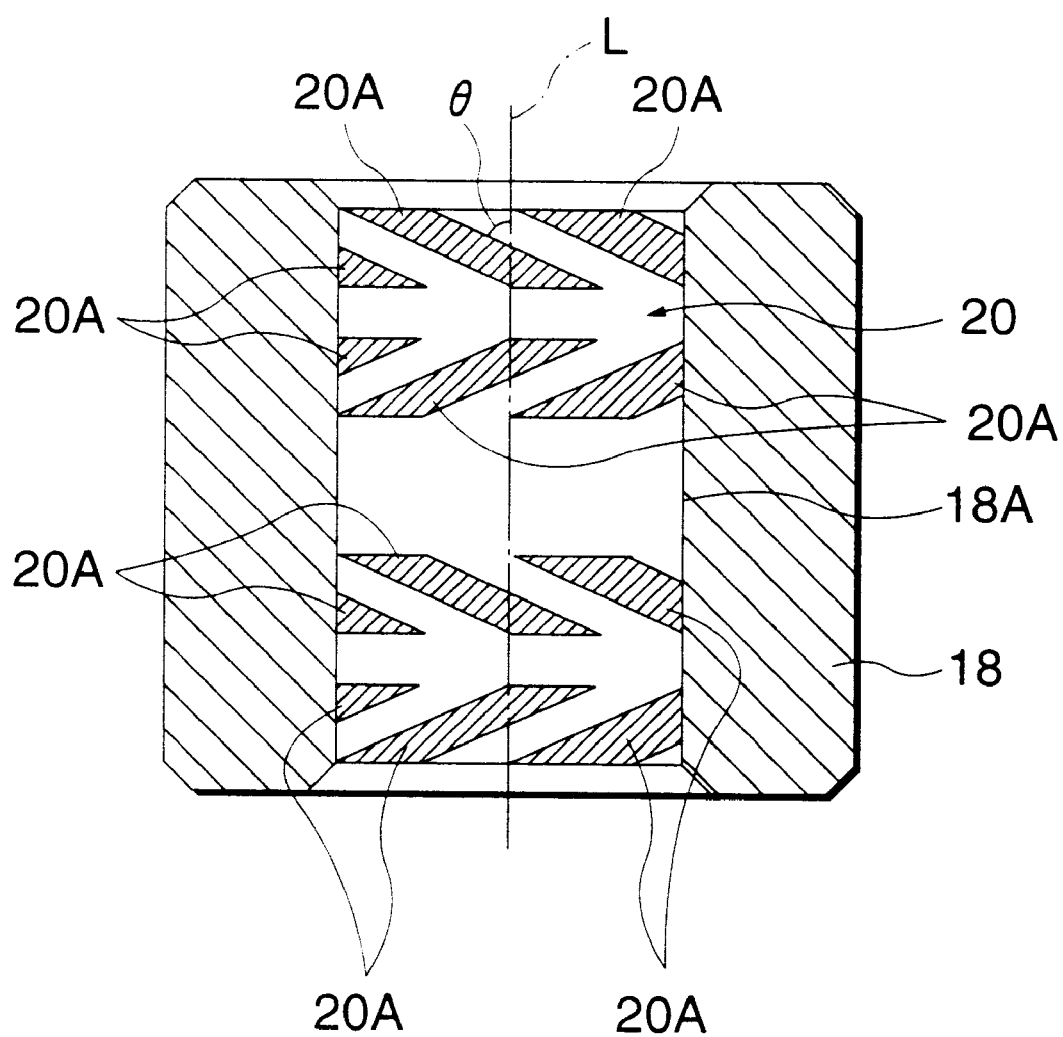
FIG. 2 is a front sectional view showing an example of a dynamic pressure generation section of a bearing of the motor of FIG. 1.

Referring now to FIGS. 1–2, a preferred embodiment of a motor 40 for rotating a disk-shaped information recording medium in a disk drive apparatus in accordance with the teachings of the present invention is illustrated. As is shown therein, the motor 40, which is what is called a spindle motor, has a rotor assembly R, a stator assembly S, and other components. The rotor R can rotate continuously around the stator S with a shaft 1 as the center of rotation.

The rotor assembly R includes a shaft 1, a disk hub seating sheet 2, a boss 3, a disk chucking magnet 4, and a rotor case 5. One end portion 1A of the shaft 1 is shaped in approximately a semi-spherical shape, and the shaft 1 is formed with a recess 1B at a middle position thereof extending over the entire circumference. A lower end portion 1C of the shaft 1 is also shaped in a generally semi-spherical shape. The shaft 1 is supported rotatably in such a manner as to be supported by a bearing 18 in the radial direction and by a thrust bearing 19 in the shaft thrust direction.

The bearing 18 is formed by compression-molding and then by sintering with a copper-type or ion-type metal powder. The thrust bearing 19 is a resin sheet made of polyamide (nylon) or the like.

The disk hub seating sheet 2 of FIG. 1, which is used to improve slidability in chucking a disk-shaped information recording medium D that is to be rotated, is preferably made of ethylene tetrafluoride film. The disk hub seating sheet 2 is bonded to the boss 3 by an adhesive. The boss 3, which is made of brass or a brass-like material, is fixed to the shaft 1 at an intermediate position above the recess 1B by press fitting or the like.

The rotor case 5 is fixed to the boss 3 by caulking or another appropriate securing method. The rotor case is made of a magnetic material, such as galvanized sheet iron SECC (JIS symbol of a steel sheet).

The disk chucking magnet 4 for chucking a disk on the disk hub seating sheet 2 is provided on the rotor case 5. A rotor magnet 5A is attached to the inside surface of the rotor case 5 so as to extend in the circumferential direction. The rotor magnet 5A is magnetized in such a manner that N poles and S poles are arranged alternately in the circumferential direction.

For example, the disk-shaped information recording medium D can be a relatively lower-capacity floppy disk 41 or a relatively higher-capacity floppy disk 43 having a case (both shown in FIG. 1). The disk chucking magnet 4 serves to magnetically attract the metal hub portion 42 of the disk-shaped information recording medium D. The hub portion 42 is seated on the disk hub seating sheet 2 in this operation, whereby slidability at the time of disk chucking is improved.

Next, the stator S shown in FIG. 1 includes a bearing housing 10, laminated iron cores 11, windings 12, a motor base (stator circuit board) 13, a labyrinth seal presser 16, a labyrinth seal 17, a bearing 18, a thrust receiver 19, a thrust receiver presser 20, and other components.

The bearing housing 10 supports the bearing 18. Each winding assembly formed of a laminated iron core 11 and a winding 12 is opposed to the rotor magnet 5A of the rotor R. A plurality of assemblies formed of a laminated iron core 11 and a winding 12 are arranged over the motor base 13 of the stator S around the bearing housing 10.

The ring-shaped labyrinth seal presser 16 and the ring-shaped labyrinth seal 17 are provided in the vicinity of the top opening of the bearing housing 10. The labyrinth seal presser 16 and the labyrinth seal 17 are disposed at positions corresponding to the recess 1B of the shaft 1. The labyrinth seal 17 prevents oil in the bearing housing 10 from leaking through the top opening 10A of the bearing housing 10.

The thrust receiver 19 and the thrust receiver presser 20 are provided on the side of the bottom opening 10B of the bearing housing 10. With this arrangement, the oil that is sealed in the bearing housing 10 does not leak through the opening 10A nor the opening 10B.

A control section 50 is connected to the motor base (stator circuit board) 13 as well as a sensor 51. For example, the sensor 51 may be a limit switch having mechanical contacts or an optical sensor having light emitting and receiving elements. The sensor 51 judges whether a relatively lower-capacity floppy disk 41 or a higher-capacity floppy disk 43 is supported on the boss 3.

In the example of FIG. 1, whereas holes 43A and a hole 43B are formed in the case of the higher-capacity floppy disk 43, only holes 41A are formed in the case of the relatively-lower capacity floppy disk 41. Therefore, if the sensor 51, such as a limit switch, detects the hole 43B of the floppy disk 43, it senses that the mounted floppy disk is a higher-capacity floppy disk 43. In contrast, if the sensor 51 cannot detect presence of a hole 43B, it senses (detects) that the mounted floppy disk is a relatively lower-capacity floppy disk 41. If used as the disk shaped information recording medium D, the capacity of the relatively lower-capacity floppy disk 41 is, for example, 2 MB in an unformatted state. Alternatively, if used as the disk-shaped recording medium D, the capacity of the higher-capacity floppy disk 43 is, for example, 100 MB.

As shown in FIG. 2, the inside circumferential surface 18A of the bearing 18 (see FIG. 1) is formed with a dynamic pressure generation section 20 in a predetermined pattern. In the dynamic pressure generation section 20, grooves 20A for dynamic pressure generation are formed in a prescribed shape. As the shaft 1 rotates, the dynamic pressure generation section 20 of the bearing 18 generates dynamic pressure that acts on the shaft 1. This enables the shaft 1 to rotate smoothly at high speed.

Each laminated iron core 11 of the stator S is formed by laminating magnetic steel sheets, such as silicon steel sheets, and a winding 12 is provided thereon. The laminated iron cores 11 and the windings 12 are fixed so as to be opposed to the rotor magnet 5A in radial directions. The motor base 13 is a metal circuit board, for example. The rotor R is driven by supplying electricity to the windings 12 via the wiring on the motor base 13, a harness and a drive circuit (both the harness and drive circuit not shown in FIG. 1).

The plurality of dynamic pressure grooves 20A are formed so as to be inclined with respect to the axial direction L of the bearing 18 by a predetermined angle. The space between the dynamic pressure grooves 20A and the shaft 1 (see FIG. 1) is filled with oil for causing a hydraulic dynamic pressure effect. Examples of the oil utilized for this hydraulic dynamic pressure effect are hydrocarbon oil, ester oil, and olefin oil.

Next, the operation of the above-described motor will be described.

The relatively lower-capacity floppy disk 41 shown in FIG. 1 has a capacity of, for example, 2 MB in an unformatted state. When the relatively lower capacity floppy disk 41 is used, the rotation speed of the motor 40 is as low as about 300 rpm, for example. In addition, if the relatively lower capacity floppy disk 41 is used, the bearing 18 supports the shaft 1 and functions as a sliding bearing, that is, a metal bearing.

On the other hand, when the higher-capacity floppy disk 43 is used, the rotation speed of the motor 40 is as high as about 3,600 rpm to increase the data transfer rate. Therefore, the dynamic pressure grooves 20A that are formed on the bearing 18 can provide hydraulic dynamic pressure for supporting the shaft 1 by filling oil in the space between the shaft 1 and the bearing 18 (see FIG. 2). That is, the bearing 18 functions as a hydraulic dynamic pressure bearing and can thereby provide high rotational accuracy with an extremely small degree of axial deviation.

For example, when the relatively lower-capacity floppy disk 41 shown in FIG. 1 is placed on the boss 3 of the motor 40, the hub 42 of the disk-shaped information recording medium D is magnetically attracted by the disk chucking magnet 4. In this manner, the hub 42 is brought into close contact with the disk hub seating sheet 2. In this state, if the sensor 51 judges that the information recording medium D is the relatively lower-capacity floppy disk 41, the control section 50 causes power to be supplied to the windings 12 so that the rotor R of the motor 40 will rotate at a speed of about 300 rpm, for example. In this case, the oil does not generate dynamic pressure and hence the bearing 18 supports the shaft 1 while functioning as a sliding bearing, that is, a metal bearing.

In contrast, when the higher-capacity floppy disk 43 is chucked, the sensor 51 detects the presence of the higher-capacity floppy disk 43. Therefore, the control section 50 causes power to be supplied to the coils 12 so that the rotor R will rotate at a speed as high as about 3,600 rpm, for example. In the case of such high-speed rotation, the oil that is provided adjacent to the dynamic pressure generating section 20 between the shaft 1 and the bearing 18 generates dynamic pressure. Accordingly, the bearing 18 functions as a hydraulic dynamic pressure bearing for supporting the shaft that is rotating at a high speed, whereby high accuracy with a small degree of axial deviation can be obtained.

Next, FIG. 3 shows another embodiment of a motor for rotating a disk-shaped information recording medium of the invention. The motor 80 of the FIG. 3 embodiment is arranged in approximately in the same manner as the motor 1 of the embodiment of FIG. 1, and is different from the latter in that a dynamic pressure generation section 60 is formed on an intermediate portion of the shaft 1 rather than on the inside circumferential surface of the bearing 18. Specifically, dynamic pressure grooves 20A are formed on the intermediate portion of the shaft 1 approximately in the same pattern as the dynamic pressure grooves 20A shown in the bearing 18 of the motor 1 of FIG. 2.

This arrangement can also provide the same action and advantageous effects as the motor in the embodiment of FIG. 1. The other components of the motor 80 of FIG. 3 are the same as the corresponding components shown in FIG. 1 and hence the descriptions for the latter are herein referred to.

Although the above embodiments relate to a floppy disk (magnetic disk), as an example of a disk-shaped information recording medium for use with this motor, the invention is not so limited and can be applied to other kinds of disk-shaped recording media in cases where, for example, it is necessary to use both low-speed rotation and high-speed rotation. That is, the motor of this invention can be used not only as a spindle motor for a drive apparatus for driving a magnetic disk but also can be used for driving an optical disc or a magneto-optical disc. In addition to drive apparatuses for driving an optical disc or a magneto-optical disc, the motor of the invention can also be used in a hard disk (HD) drive, a R-HDD (removable hard disk drive), and a drive apparatus for driving a high-density information recording medium such as a digital versatile disc (digital video disc) DVD.

In the motor of the invention, the bearing functions as a sliding bearing when a relatively lower-capacity floppy disk of 2 about MB in an unformatted state is used and as a bearing that achieves a dynamic pressure effect when a higher-capacity floppy disk is used. Therefore, the invention makes it possible to provide a spindle motor which assures high axial deviation accuracy in using a higher-capacity floppy disk. At this same time, the spindle motor of the invention is inexpensive.

As described above, the invention makes it possible to rotate a higher-capacity information recording medium and a relatively lower-capacity recording medium at different speeds.

Although certain preferred embodiments of the invention have been described in detail with reference to the accompanying drawings, it is to be understood that the present invention is not limited to those precise embodiments, and that many changes and modifications could be effected therein by one skilled in the art without departing from the spirit and scope of the invention as defined in the appended claims.

What is claimed is:

1. A motor for rotating a disk-shaped information recording medium, said motor comprising:

a stator;

a rotor that rotates with respect to the stator with a shaft as a center of rotation when a drive winding is energized;

a disk chucking portion for supporting the disk, which is provided on said rotor;

a bearing that is provided on the side of the stator and rotatably supports the shaft of the rotor;

a dynamic pressure generation section for generating dynamic pressure by filling oil between the bearing and the shaft when the shaft is rotated above a predetermined speed; and wherein said rotor rotates in a first rotation speed or a second rotation speed that is higher than the first rotation speed based on a control signal.

2. The motor according to claim 1, wherein said dynamic pressure generation section is formed on a cylindrical inside surface of the bearing that is opposed to an outside circumferential surface of the shaft.

3. The motor according to claim 1, wherein said dynamic pressure generation section is formed on an outside circumferential surface of the shaft that is opposed to an inside surface of the bearing.

4. The motor according to claim 1, wherein said rotor rotates in said two different speeds selectively based on a type of the recording medium.

5. The motor according to claim 1, wherein said disk chucking portion is selectively attachable to at least two types of recording medium which have recording medium capacities which are different from each other.

6. The motor according to claim 1, wherein said first rotation speed is about 300 rpm and said second rotation speed is about 3600 rpm.

7. The motor according to claim 1, wherein said dynamic pressure generation section generates dynamic pressure when the dynamic pressure generation section is turned at the second rotation speed.

8. A motor for rotating a disk-shaped information recording medium, said motor comprising:
    a stator;
    a rotor that rotates with respect to the stator with a shaft as a center of rotation when a drive winding is energized;
    a disk chucking magnet for chucking the disk which is provided on said rotor;
    a bearing that is provided on the side of the stator and rotatably supports the shaft of the rotor; and
    a dynamic pressure generation section for generating dynamic pressure by filling a fluid between the bearing and the shaft when the shaft is rotated above a predetermined speed;
    wherein said rotor rotates in a first rotation speed or a second rotation speed that is higher than the first rotation speed based on a control signal; and
    wherein said dynamic pressure generation section generates dynamic pressure when the rotor is rotated at the second rotation speed.

9. The motor according to claim 8, wherein said dynamic pressure generation section is formed on a cylindrical inside surface of the bearing that is opposed to an outside circumferential surface of the shaft.

10. A disk drive apparatus having a motor for rotating a disk-shaped information recording medium, said motor comprising:
    a stator;
    a rotor that rotates with respect to the stator with a shaft as a center of rotation when a drive winding is energized;
    a disk chucking portion for supporting the disk, which is provided on said rotor;
    a bearing that is provided on the side of the stator and rotatably supports the shaft of the rotor;
    a dynamic pressure generation section for generating dynamic pressure by filling oil between the bearing and the shaft when the shaft is rotated above a predetermined speed;
    judging means for judging whether the disk-shaped information recording medium that is attached to the disk chucking portion is a first type medium or a second type medium; and
    control means for supplying the drive winding of the stator with a drive signal for a first rotation speed when a judgment signal produced by the judging means indicates the first type medium, and with a drive signal for a second rotation speed that is higher than the first rotation speed when the judgment signal indicates the second type medium.

11. The disk drive apparatus of claim 10, wherein said dynamic pressure generation section is formed on a cylindrical inside surface of the bearing that is opposed to an outside circumferential surface of the shaft.

12. The disk drive apparatus of claim 10, wherein said dynamic pressure generation section is formed on an outside circumferential surface of the shaft that is opposed to an inside surface of the bearing.

13. The disk drive apparatus of claim 10, wherein said judging means detects, through contact, a hole that is provided in a case of the disk-shaped information recording medium having the second type medium, and the control means supplies the drive winding of the stator with the drive signal for the second rotation speed when the judging means detects the hole.

14. The disk drive apparatus of claim 10, wherein said recording capacity of the second type medium is larger than the recording capacity of the first type medium.

15. The disk drive apparatus of claim 10, wherein said first rotation speed is about 300 rpm and said second rotation speed is about 3600 rpm.

16. The disk drive apparatus of claim 10, wherein said dynamic pressure generation section generates dynamic pressure when the dynamic pressure generation section is turned at the second rotation speed.

17. A disk drive apparatus having a motor for rotating a disk-shaped information recording medium, said motor comprising:
    a stator;
    a rotor that rotates with respect to the stator with a shaft as a center of rotation when a drive winding is energized;
    a disk chucking magnet for chucking the disk which is provided on said rotor;
    a bearing that is provided on the side of the stator and rotatably supports the shaft of the rotor;
    a dynamic pressure generation section for generating dynamic pressure by filling a fluid between the bearing and the shaft when the shaft is rotated above a predetermined speed;
    judging means for judging whether the disk-shaped information recording medium that is attached to the disk chucking magnet is a relatively lower-capacity medium or a higher-capacity medium; and
    control means for supplying the drive winding of the stator with a drive signal for a first rotation speed when a judgment signal produced by the judging means indicates the relatively lower-capacity medium, and with a drive signal for a second rotation speed that is higher than the first rotation speed when the judgment signal indicates the higher-capacity medium; and
    wherein said dynamic pressure generation section generates dynamic pressure when the dynamic pressure generation section is turned at the second rotation speed.

18. The disk drive apparatus of claim 17, wherein said dynamic pressure generation section is formed on a cylindrical inside surface of the bearing that is opposed to an outside circumferential surface of the shaft.

* * * * *